Aug. 29, 1944.   F. F. MEYER   2,356,941
TRAILER SUPPORT
Filed Sept. 27, 1943

INVENTOR
Frank F. Meyer
BY
John G. Crosmith
ATT'Y

Patented Aug. 29, 1944

2,356,941

UNITED STATES PATENT OFFICE 2,356,941

TRAILER SUPPORT

Frank F. Meyer, near San Jose, Calif.

Application September 27, 1943, Serial No. 504,069

1 Claim. (Cl. 248—352)

The present invention relates to means for supporting the body of a house trailer when parked.

When an automobile house trailer is pulled into position and parked it is common practice to jack it up to the desired height and then prevent the body from rocking by building up supports under the opposite sides. It is necessary to do this because when the body is merely jacked up in the conventional manner it is still subject to a rocking movement whenever the weight on one side exceeds that upon the other. The result is that each time a person enters or leaves the trailer house, or moves from one side to the other, the floor is thrown out of level causing maladjustments through out the trailer and rendering its occupancy uncomfortable.

The method commonly used to prevent the difficulty above indicated is to carry a large number of wood blocks in the trailer, and then when it is parked as desired to pile these blocks under each corner to solidly support the body. But this procedure is far from satisfactory because of the bulky supply of blocks that must be carried about in the trailer, because of the difficulty in properly placing the blocks in inclement weather and on uneven ground, because of the difficulty in finding blocks of the desired thickness to reach the desired level, because of the time required to select and place the blocks, and for many kindred reasons.

It is, therefore, the object of my invention to provide a means for quickly and easily stabilizing a trailer body.

It is also an object of the invention to provide means for the purpose indicated so formed and constructed that the trailer body may be quickly and easily brought to a perfect level and firmly supported in that position regardless of the shifting weights thereon.

It is a further object of my invention to provide means of the character indicated that may be so assembled as to positively prevent the entrance of ants into the trailer.

Finally, it is an object of my invention to provide a means of the character indicated that will be simple in form and construction, light in weight, easily stored in a small space in the trailer body when not in use, strong, durable, and highly efficient in its practical application.

Figures 1, 2:
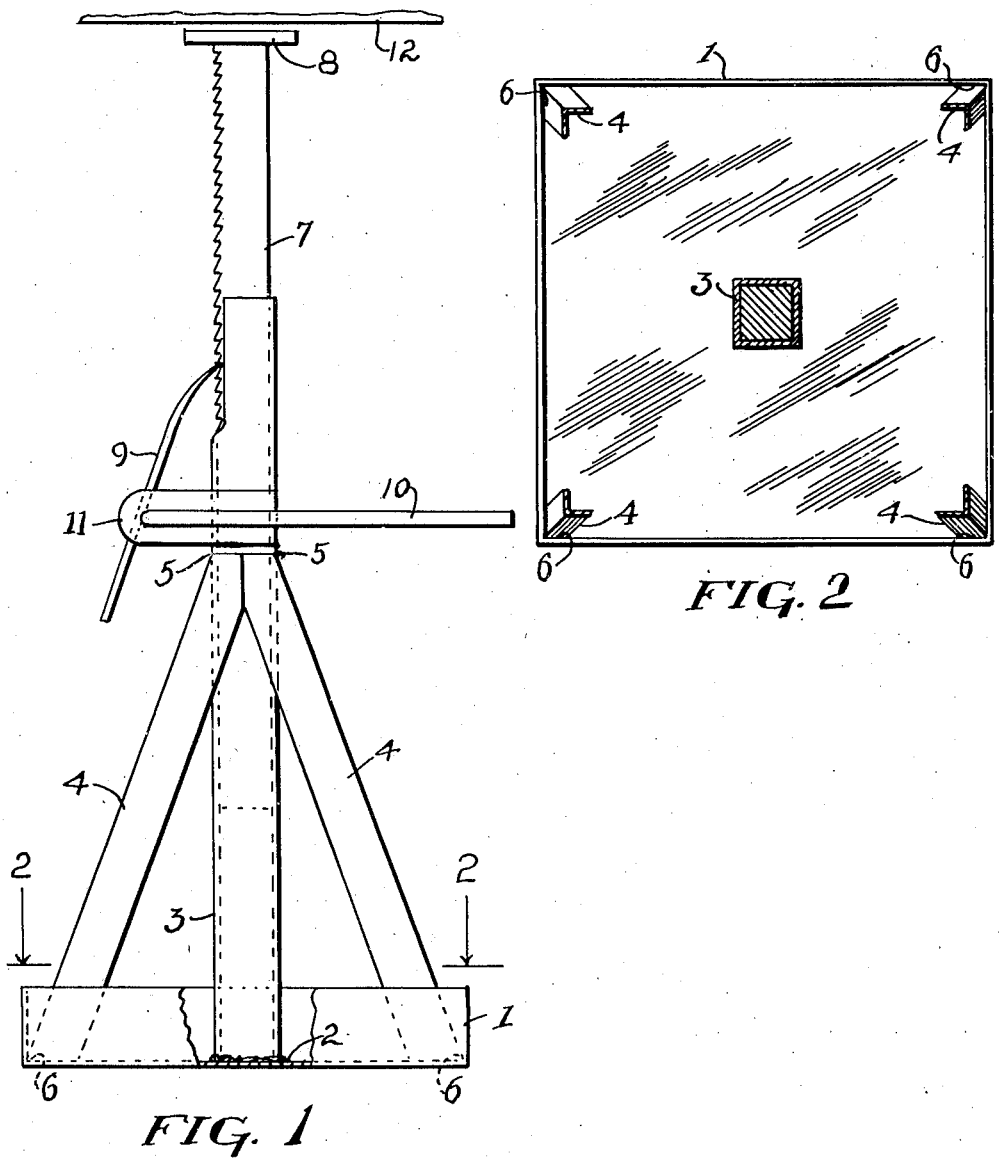
Figure 1 is a side elevational view of a device embodying my invention, a part being broken away.
Figure 2 is a sectional plan view taken on line 2—2 of Figure 1.

Referring now more particularly to the drawing, I show at 1 a flat bottomed pan of any suitable material that will hold a liquid, and of any desired size and formation.

Rising from the center of the pan 1 in vertical relation thereto and welded in place at 2 to form an integral part of the pan, is a hollow tube 3. The tube 3 is rigidly supported in its vertical position by means of four braces as 4 attached to its four corners as at 5 and extending outwardly and downwardly to seat in the four corners of the pan as at 6.

The tube 3 is square in horizontal cross-section and a ratchet 7 is slidably mounted therein as shown and fitted with a top cap 8.

At 9 is shown a dog urged into engagement with the teeth of ratchet 7 by being mounted on an arm 10 disposed as shown and rotatably mounted in a bracket 11 on tube 3.

When a house trailer has been pulled into position for parking, it is first jacked up in the usual manner to the required height and then the operator places one of these supports under each corner of the body and then pushes up the ratchet 7 until it nearly contacts the body 12 of the trailer. Then by releasing the jack the body is allowed to seat upon the several supports which provide a solid unshakable foundation therefor.

When it is desired to move the trailer it is only necessary to jack it up slightly to take the weight off of the supports, then drop the ratchets down in the tubes and place the supports in the trailer. The manner in which the device is made provides great strength and yet keeps the weight down to a point where it can be handled with ease and stored in a very small space when not in use.

One serious objection to the use of supports made of piled up wood blocks is the fact that they afford easy access to the trailer by ants. But by throwing a little water or other ant repellent into the pan 1, the ants are definitely and positively kept out of the trailer. When the trailer is to be moved the water or other substance may be poured out of the pan before it is placed in storage.

It may be readily understood from the foregoing disclosure that I have provided a device that functions perfectly both as a support for the trailer body and as a means for preventing the access of ants to the trailer, a device that enables the traveller to set his trailer upon a firm, level foundation in a fraction of the time ordinarily required to place it upon an unsatisfactory one.

Although but one specific embodiment of the invention has herein been illustrated and described, it will be understood that various alterations in the details of construction and mode of assembly and operation may be made without departing from the scope of the invention as indicated in the appended claims.

I claim:

A trailer support comprising in combination, a pan adapted to contain an insecticide, a tube rigidly and vertically mounted in the center of the pan, braces extending from the upper portion of the tube to the periphery of the pan to seat against the sides thereof, a ratchet slidably mounted to extend from the upper end of the tube and provided with a top plate constructed and arranged to engage a trailer body, and a ratchet engaging dog mounted on the tube.

FRANK F. MEYER.